(12) United States Patent
Gomez et al.

(10) Patent No.: US 8,778,820 B2
(45) Date of Patent: Jul. 15, 2014

(54) GLASSES HAVING LOW SOFTENING TEMPERATURES AND HIGH TOUGHNESS

(75) Inventors: Sinue Gomez, Corning, NY (US); Lisa Ann Lamberson, Painted Post, NY (US); Robert Michael Morena, Lindley, NY (US)

(73) Assignee: Corning Incorporated, Corning, NY (US)

( * ) Notice: Subject to any disclaimer, the term of this patent is extended or adjusted under 35 U.S.C. 154(b) by 92 days.

(21) Appl. No.: 12/788,559

(22) Filed: May 27, 2010

(65) Prior Publication Data

US 2011/0294649 A1  Dec. 1, 2011

(51) Int. Cl.
*C03C 3/091* (2006.01)
*C03C 3/083* (2006.01)

(52) U.S. Cl.
USPC .............................................. 501/66; 501/68

(58) Field of Classification Search
USPC ................. 501/55, 66, 68; 428/220
See application file for complete search history.

(56) References Cited

U.S. PATENT DOCUMENTS

| | | | |
|---|---|---|---|
| 7,687,420 B2 | 3/2010 | Murata | |
| 2009/0142568 A1* | 6/2009 | Dejneka et al. | 428/220 |
| 2009/0325776 A1* | 12/2009 | Murata | 501/66 |
| 2010/0035745 A1* | 2/2010 | Murata | 501/66 |
| 2010/0047521 A1 | 2/2010 | Amin et al. | |

FOREIGN PATENT DOCUMENTS

| | | |
|---|---|---|
| EP | 2075237 | 7/2009 |
| GB | 1246384 | 9/1971 |
| WO | 2009041348 | 4/2009 |
| WO | 2011022661 | 2/2011 |

* cited by examiner

*Primary Examiner* — Noah Wiese
(74) *Attorney, Agent, or Firm* — Robert P. Santandrea

(57) ABSTRACT

Glasses having a low softening point and high toughness. The glasses are alkali aluminoborosilicate glasses having softening points of less than 900° C. and, in some embodiments, in a range from about 650° C. up to about 825° C., and an indenter damage threshold of at least 300 g for glasses that are not chemically strengthened. The glasses are free of alkaline earth metals, lead, arsenic, antimony, and, in some embodiments, lithium.

25 Claims, 5 Drawing Sheets

GLASSES HAVING LOW SOFTENING TEMPERATURES AND HIGH TOUGHNESS

BACKGROUND

The disclosure relates to glasses having a low softening point and high damage resistance.

Magnesium alkali aluminosilicate and soda lime glasses are currently being used in consumer electronic products. Magnesium alkali aluminosilicate glasses often have softening points that are so high as to damage steel molds that are used for sagging the glass into the desired contour for selected applications, whereas soda lime glasses cannot be adequately strengthened by ion exchange. In addition, the coefficient of thermal expansion of such glasses tends to be high, thus making these glasses prone to cracking during rapid thermal changes.

SUMMARY

Glasses having a low softening point and high toughness are provided. The glasses are alkali aluminoborosilicate glasses having softening points of less than 900° C. and in some embodiments, in a range from about 650° C. up to about 825° C. The glasses have an indenter damage threshold of at least 300 g and, when strengthened by ion exchange, have a damage threshold of at least 3000 g. The glasses are free of alkaline earth metals, lead, arsenic, and antimony, in some embodiments, lithium.

Accordingly, one aspect of the disclosure is to provide an alkali aluminoborosilicate glass having a softening point in a range from 650° C. up to 825° C. and an indenter damage threshold of at least 300 g. The glass is free of alkaline earth metals, lead, arsenic, and antimony.

A second aspect of the disclosure is to provide an alkali aluminoborosilicate glass having a surface layer under compressive stress, a softening point of less than 900° C., and an indenter damage threshold of at least 5 kg. The glass is free of alkaline earth metals, lead, arsenic, and antimony.

These and other aspects, advantages, and salient features will become apparent from the following detailed description, the accompanying drawings, and the appended claims.

DETAILED DESCRIPTION

Figure 1:
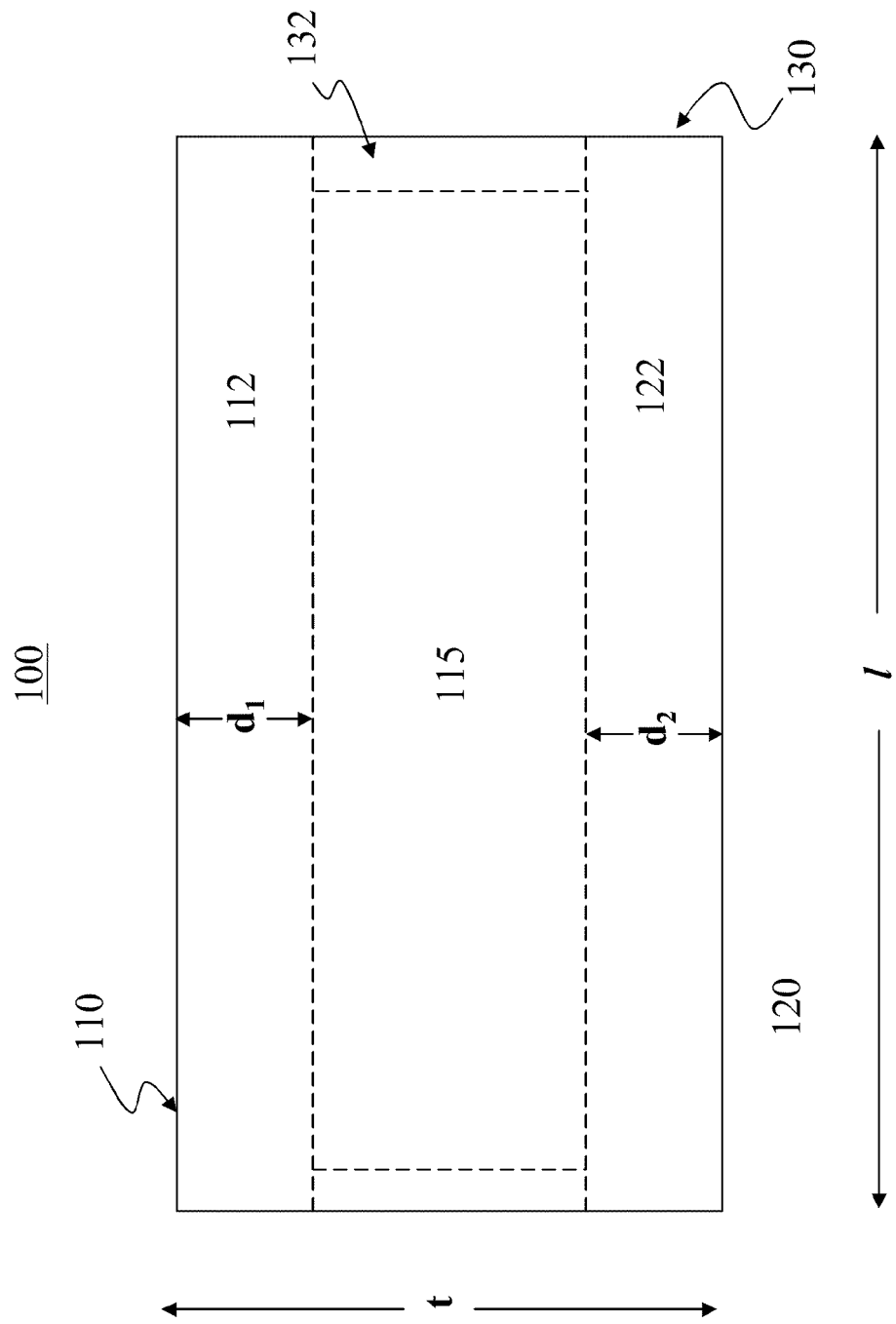
FIG. 1 is a schematic cross-sectional view of a glass sheet strengthened by ion exchange.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range and any sub-ranges therebetween. All compositions are expressed in mole percent (mol %), unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "softening point" and "softening temperature" refer to the temperature at which a glass flows and has a viscosity of $10^{7.6}$ poise (P). Unless otherwise specified, the term "indenter threshold" refers to the load on a Vickers indenter that is needed to initiate Vickers (i.e., radial) cracks at the corners of the indent.

Consumer electronic products ranging from laptop computers to cell phones, music and video players, and the like frequently include glass, such as magnesium alkali aluminosilicate glasses, that can be strengthened by ion exchange. Such glasses, however, have softening points that are so high as to damage steel molds that are used for sagging the glass into the desired contour or three-dimensional shape for selected applications. In addition, the coefficient of thermal expansion (CTE) of such glasses tends to be high (e.g., about $91 \times 10^{-7}/°$ C.), thus making these glasses prone to cracking during rapid thermal changes.

Accordingly, a glass article that has a lower softening temperature and lower CTE and is suitable for such applications is provided. In addition, the glass has excellent ion exchange properties, a high resistance to crack initiation, and is fusion formable. The glass article comprises an alkali aluminoborosilicate glass having, in some embodiments, a softening point of less than about 900° C., in other embodiments, a softening point of less than about 825° C. and, in still other embodiments, in a range from about 650° C. up to about 825° C. In some embodiments, the alkali aluminoborosilicate glass has an indenter damage threshold of at least 300 g without chemical strengthening by ion exchange. The alkali aluminoborosilicate glass is free of alkaline earth metals and lead. In some embodiments, the alkali aluminoborosilicate glass is free of at least one of lithium, arsenic, antimony, lead, and/or transition metals.

In some embodiments, the alkali aluminoborosilicate glass is strengthened by ion exchange. In this process, ions in the surface layer of the glass are replaced by—or exchanged with—larger ions having the same valence or oxidation state as the ions present in the glass. Ions in the surface layer of the alkali aluminoborosilicate glass and the larger ions are monovalent metal cations such as, but not limited to, $Na^+$, $K^+$, $Rb^+$, $Cs^+$, $Ag^+$, $Tl^+$, $Cu^+$, and the like.

Ion exchange processes typically comprise immersing the alkali aluminoborosilicate glass in a molten salt bath containing the larger ions to be exchanged with the smaller ions in the glass. It will be appreciated by those skilled in the art that parameters for the ion exchange process including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass to be achieved by the strengthening operation. By way of example, ion exchange of alkali metal-containing glasses can be achieved by immersion in at least one molten salt bath containing a salt such as, but not limited to, nitrates, sulfates, and chlorides of the larger alkali metal ion. The temperature of the molten salt bath is typically in a range from about 380° C. up to about 450° C., and immersion times range up to about 16 hours. However, temperatures and immersion times that are different from those described above can also be used. Such ion exchange treatments typically result in strengthened alkali aluminoborosilicate glasses having an outer surface layer (also referred to herein a "depth of layer" or "DOL") that is under compressive stress.

A cross-sectional view of an alkali aluminoborosilicate glass sheet strengthened by ion exchange is schematically shown in FIG. 1. Strengthened glass sheet 100 has a thickness t, a first surface 110 and second surface 120 that are substantially parallel to each other, central portion 115, and edges 130 joining first surface 110 to second surface 120. Strengthened glass sheet 100 has strengthened surface layers 112, 122 extending from first surface 110 and second surface 120, respectively, to depths $d_1$, $d_2$, below each surface. Strengthened surface layers 112, 122 are under a compressive stress, while central portion 115 is under a tensile stress, or in tension. The tensile stress in central portion 115 balances the compressive stresses in strengthened surface layers 112, 122, thus maintaining equilibrium within strengthened glass sheet 100. The depths $d_1$, $d_2$ to which the strengthened surface layers 112, 122 extend are generally referred to individually as the "depth of layer." A portion 132 of edge 130 may also be strengthened as a result of the strengthening process. Thickness t of strengthened glass sheet 100 is generally in a range from about 0.1 mm up to about 2 mm. In one embodiment, thickness t is in a range from about 0.5 mm up to about 1.3 mm.

The ion exchanged glass sheet 100 has an indenter damage threshold of at least 3000 g. In some embodiments, the indenter threshold of the alkali aluminoborosilicate glass is in a range from about 3000 g up to about 10,000 g. In one embodiment, ion exchanged surface layers 112, 122, each have a depth of layer of at least 20 μm and a compressive stress of at least about 600 MPa.

In some embodiments, the alkali aluminoborosilicate glass comprises, consists essentially of, or consists of: 50-70 mol % $SiO_2$; 5-15 mol % $Al_2O_3$; 5-20 mol % $B_2O_3$; 0-15 mol % $Li_2O$; 0-20 mol % $Na_2O$; and 0-10 mol % $K_2O$; and is substantially free of alkaline earth oxides (i.e., alkaline earth oxides are not actively or intentionally added to the glass, but may be present in small amounts as minor contaminants). In some embodiments, the glass can further comprise up to 10 mol % $P_2O_5$ and/or up to 3.3 mol % of $SnO_2$ can be added as a fining agent. In some embodiments, the alkali aluminoborosilicate glass is also substantially free of at least one of lithium, antimony, arsenic, lead, silver, and copper. In other embodiments, halogens such as fluorine, chlorine, and bromine can be added as fining agents to the alkali aluminoborosilicate glass. Alternatively, up to 3.3 mol % of $SnO_2$ can be added as a fining agent.

In some embodiments, the alkali aluminoborosilicate glass is down-drawn, using those methods known in the art such as, but not limited to fusion-drawing, slot-drawing, re-drawing, and the like, and has a liquid viscosity of at least 135 kpoise (KP). In other embodiments, the alkali aluminoborosilicate glass has a viscosity of at least 1 Mpoise (MP). In all of the embodiments described hereinabove, the alkali aluminoborosilicate glass is, in some embodiments, inert with respect to zircon at those temperatures where the viscosity of the glass has a viscosity of at least 5 kpoise.

Representative compositions and physical properties of the alkali aluminoborosilicate glasses described herein are listed in Tables 1a and 1b. Properties such as strain point, anneal point, and softening point were determined by fiber elongation. Ion exchange (IX) properties such as depth of layer and surface compressive stress (CS) were obtained by polarized microscopy and/or surface stress meter, respectively, with central tension or central tensile stress (CT) being calculated from DOL and CS values.

The ion exchange properties listed in Table 1a were obtained using single-step ion exchange treatments (i e, immersion of the glass in a single ion exchange or salt bath of either 100% $NaNO_3$ or mixtures (60/40, 80/20, or 90/10 by weight) of $NaNO_3$ and $KNO_3$). In most instances, the alkali aluminoborosilicate glasses described herein are characterized by high DOL (generally greater than 100 ILtm) and relatively low CS (<50 MPa). Higher compressive stresses can be obtained using a two step IX process in which the glass is first immersed in a first ion exchange or salt bath and then immersed in a second ion exchange or salt bath having a composition that is different from that of the first bath. For example, the two step ion exchange process can include immersion in a first bath, having a composition of either 100% $NaNO_3$ or a mixture of 60% $KNO_3$/40% $NaNO_3$ by weight, at a temperature in a range from 390° C. up to 410° C. for 2 to 15 hours, followed by immersion in a second bath of either 100% $KNO_3$ or a salt of a larger cation (e.g., $RbNO_3$) at a temperature in a range from 390° C. up to 410° C. for a time period ranging from 5 minutes up to 15 hours.

Table 1b lists compositions and thermal and mechanical properties of additional alkali aluminoborosilicate glasses. Depths of layer and indentation damage thresholds are reported for glasses that had been ion exchanged using either a 100% $NaNO_3$ bath or a bath comprising 60% $KNO_3$ and 40% $NaNO_3$ by weight. Ion-exchange in mixed $K^+/NA^+$ baths allows not only for $Li^+$ in the glass to be replaced Columbus with $Na^+$ from the bath, but also allows $Na^+$ in the glass to be replaced with $K^+$ from the bath, thus increasing the compressive stress at the glass surface. The increase in CS at the surface in turn contributes to the damage resistance of the glass. Damage thresholds that were measured for the base glasses (i.e., before ion exchange, labeled "Pre-IX" in Table 1b) are also listed. Ion exchange in a 100% $NaNO_3$ bath produces depths of layer that are comparable, if not identical, to those obtained using a mixed salt bath of a 60:40 weight percent mixture of $KNO_3$:$NaNO_3$. The damage threshold for glasses ion exchanged in $NaNO_3$ is at least three times greater than that measured for the base glasses before ion exchange. The damage threshold for glasses ion exchanged in the mixed $KNO_3$:$NaNO_3$ bath is at least five times greater than that measured before ion exchange for the base glasses.

TABLE 1a

Representative compositions and physical properties of alkali aluminoborosilicate glasses described herein.

| Composition | A Wt % | A Mole % | B Wt % | B Mole % | C Wt % | C Mole % | D Wt % | D Mole % | E Wt % | E Mole % |
|---|---|---|---|---|---|---|---|---|---|---|
| $SiO_2$ | 59.1 | 63.7 | 60.8 | 65.7 | 58.4 | 63.9 | 60.6 | 65.7 | 61.1 | 63.9 |
| $Al_2O_3$ | 11.8 | 7.4 | 17.7 | 11.3 | 11.3 | 7.3 | 19.2 | 12.3 | 11.8 | 7.3 |
| $B_2O_3$ | 17.7 | 16.4 | 11.9 | 11.1 | 17.3 | 16.3 | 9.7 | 9.1 | 18.1 | 16.3 |
| $Li_2O$ | 2.1 | 4.4 | 2.1 | 4.6 | 1.6 | 3.5 | 2.3 | 5.0 | 3.1 | 6.5 |
| $Na_2O$ | 6.9 | 7.1 | 5.9 | 6.2 | 2.8 | 3.0 | 6.3 | 6.6 | 5.9 | 6.0 |
| $K_2O$ | 1.5 | 1.0 | 1.6 | 1.1 | 8.6 | 6.0 | 1.9 | 1.3 | — | — |
| $B_2O_3/Al_2O_3$ (mol %) | | 2.2 | | 1.0 | | 2.2 | | 0.7 | | 2.2 |
| $\Sigma R_2O$ (mol %) | | 12.1 | | 11.9 | | 12.5 | | 12.9 | | 12.5 |
| $\Sigma R_2O/Al_2O_3$ (mol %) | | 1.6 | | 1.1 | | 1.7 | | 1.1 | | 1.7 |
| Strain Point | | 457° C. | | 486° C. | | 457° C. | | 506° C. | | 465° C. |
| Anneal Point | | 496° C. | | 532° C. | | 497° C. | | 555° C. | | 501° C. |
| Softening Point | | 671° C. | | 771° C. | | 679° C. | | 802° C. | | 659° C. |
| CTE ($\times 10^{-7}/°$ C.) | | 67.0 | | 63.0 | | 66.3 | | 65.2 | | 59.2 |
| Density (g/cm³) | | 2.34 | | 2.31 | | 2.33 | | 2.33 | | 2.32 |
| Temperature @ 200P | | | | 1619° | | 1409° | | 1678° | | |
| Liquidus Temperature | | | | 880° C. | | <770° C. | | 960° C. | | |
| Liquidus viscosity | | | | 2 MP | | 6 MP | | >6 MP | | |
| IX properties | | | | 60:40 NaNO₃/KNO₃, (360°-8 hr) | | 60:40 NaNO₃/KNO₃, (340°-4 hr) | | | | |
| DOL (μm) | | | | 75 | | 12 | | | | |
| CS (MPa) | | | | 240 | | 157 | | | | |
| CT (MPa) | | | | 31 | | 2.0 | | | | |
| Indentation damage threshold load (g) - pre ion exchange (IX) | | (not measured) | | 500 | | 500 | | (not measured) | | 300 |

TABLE 1b

Representative compositions and physical properties of the alkali aluminoborosilicate glasses described herein.

| Composition | F Wt % | F Mole % | G Wt % | G Mole % | H Wt % | H Mole % | I Wt % | I Mole % |
|---|---|---|---|---|---|---|---|---|
| $SiO_2$ | 60.5 | 65.7 | 61.7 | 65.7 | 61.8 | 65.7 | 62.5 | 65.7 |
| $Al_2O_3$ | 19.2 | 12.3 | 19.6 | 12.3 | 19.7 | 12.3 | 16.7 | 10.3 |
| $B_2O_3$ | 9.8 | 9.1 | 10.0 | 9.1 | 7.8 | 7.1 | 10.1 | 9.1 |
| $Li_2O$ | 2.3 | 5 | 3.3 | 7 | 3.3 | 7 | 3.3 | 7 |
| $Na_2O$ | 6.3 | 6.6 | 4.5 | 4.6 | 6.4 | 6.6 | 6.5 | 6.6 |
| $K_2O$ | 1.9 | 1.3 | 1.9 | 1.3 | 1.9 | 1.3 | 1.9 | 1.3 |
| $B_2O_3/Al_2O_3$ (mol %) | | 0.74 | | 0.74 | | 0.58 | | 0.88 |
| $\Sigma R_2O$ (mol %) | | 12.9 | | 12.9 | | 14.9 | | 14.9 |
| $\Sigma R_2O/Al_2O_3$ (mol %) | | 1.05 | | 1.05 | | 1.21 | | 1.45 |
| Strain Point | | 492° C. | | 491° C. | | 480° C. | | 468° C. |
| Anneal Point | | 540° C. | | 538° C. | | 521° C. | | 507° C. |
| Softening Point | | 785° C. | | 786° C. | | 731° C. | | 691° C. |
| CTE ($\times 10^{-7}/°$ C.) | | 66 | | 62 | | 70 | | 69 |
| Density (g/cm³) | | 2.334 | | 2.327 | | 2.261 | | 2.369 |
| Temperature @ 200P | | 1633° C. | | 1608° C. | | 1614° C. | | 1544° C. |
| Liquidus Temperature | | 890° C. | | 990° C. | | 955° C. | | 880° C. |
| Liquidus viscosity | | 6 MP | | 0.4 MP | | >20 MP | | 0.3 MP |
| IX properties | | | | | | | | |
| DOL (μm) at 390° C. in NaNO₃ for 10 h | | 294 | | 270 | | 245 | | 265 |
| DOL (μm) at 390° C. in 60% KNO₃/40% NaNO₃ for 10 h | | 294 | | 270 | | 245 | | 240 |
| Indentation damage threshold load (gf) | | | | | | | | |
| Pre-IX | | 1000 | | 1000 | | 1000 | | 500 |

TABLE 1b-continued

Representative compositions and physical properties of the
alkali aluminoborosilicate glasses described herein.

| Composition | F | | G | | H | | I | |
|---|---|---|---|---|---|---|---|---|
| | Wt % | Mole % | Wt % | Mole % | Wt % | Mole % | Wt % | Mole % |
| Post-IX | | | | | | | | |
| NaNO₃ at 390° C. for 10 h | 3000 | | 3000 | | 3000 | | 3000 | |
| 60% KNO₃/40% NaNO₃ at 390° C. for 10 h | 5000 | | 7000 | | 6000 | | 6000 | |

Figure 2:
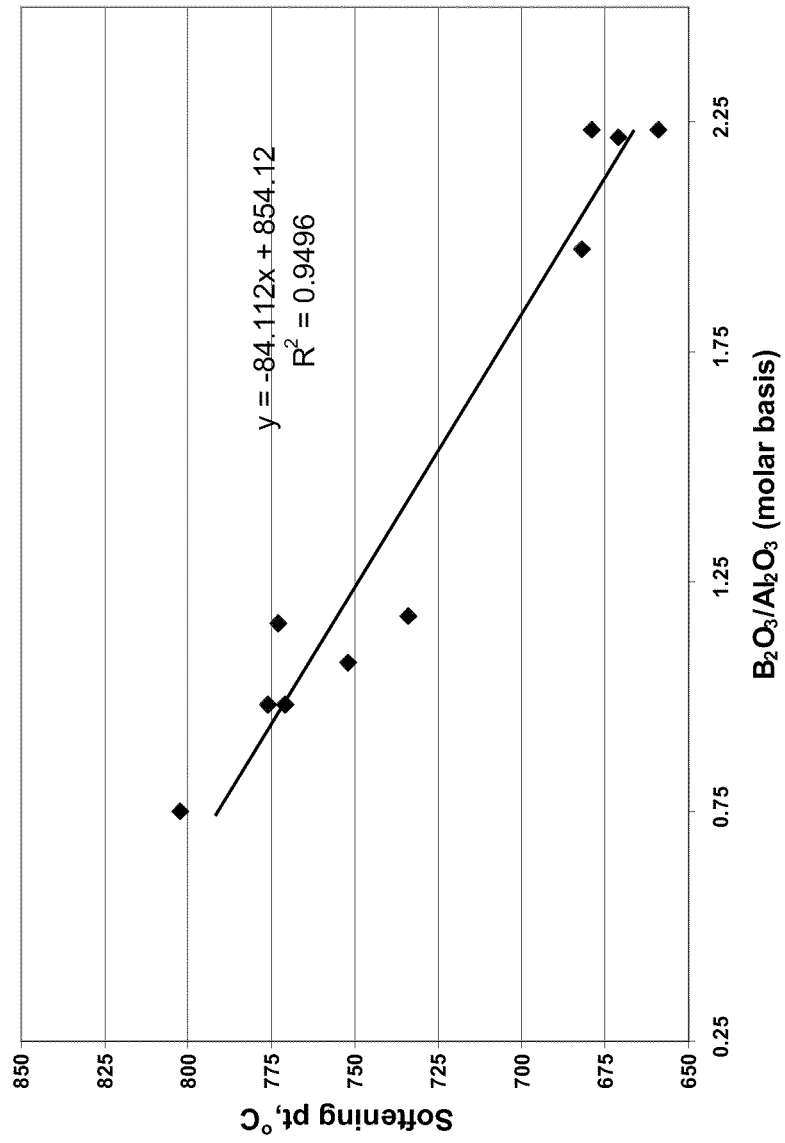
FIG. 2 is a plot of softening points of glasses as a function of the $B_2O_3/Al_2O_3$ ratio.

The ratio $B_2O_3/Al_2O_3$ in the alkali aluminoborosilicate glass has been found to be a factor in lowering the softening point of the glasses described herein. The softening points of the glasses listed in Table 1a are plotted as a function of the $B_2O_3/Al_2O_3$ molar ratio in FIG. 2. Based on high temperature viscosities and softening point data, 200 P temperatures (i.e., the temperature at which the glass has a viscosity of 200 poise) of less than 1600° C. generally results in the glass softening points of less than 750° C. As can be calculated from the linear regression curve analysis of the data shown FIG. 2, a $B_2O_3/Al_2O_3$ molar ratio of greater than 1.2 is necessary to achieve a softening point of less than 750° C. for the alkali aluminoborosilicate glasses described herein.

Figure 3:
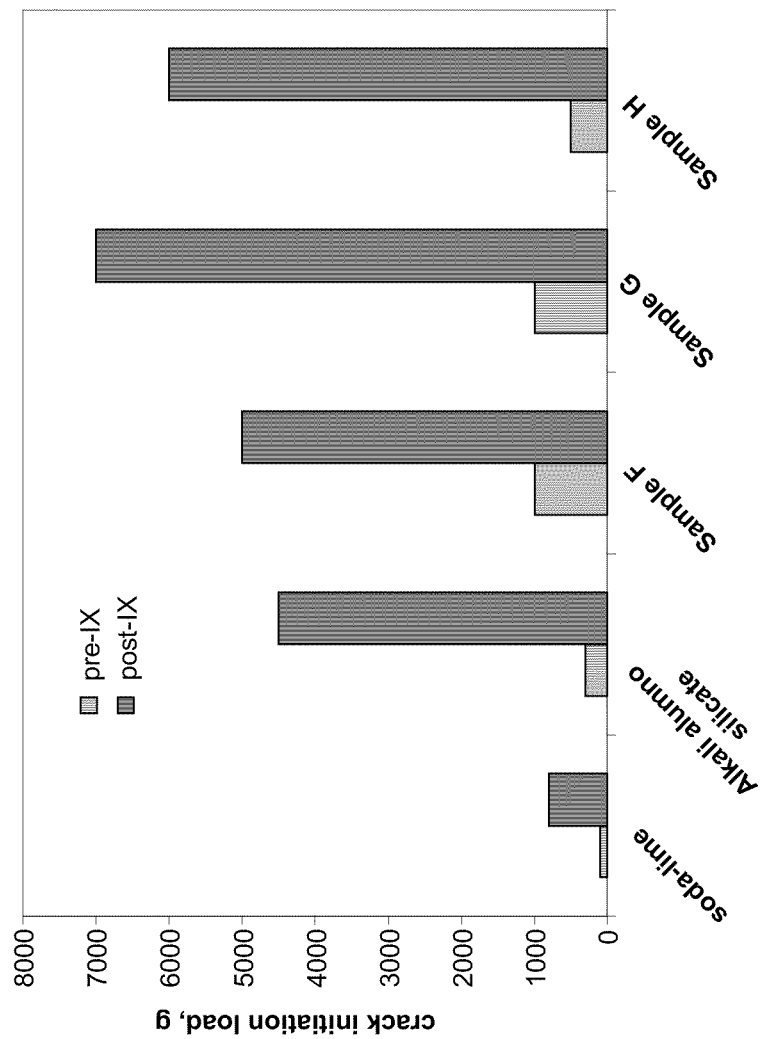
FIG. 3 is a plot of damage threshold loads for various glasses before ion exchange (pre-IX) and after ion exchange (post-IX)

The alkali aluminoborosilicate glasses described herein are more damage resistant than alkali aluminosilicate and soda-lime glasses. The intrinsically higher damage resistance of these alkali aluminoborosilicate glasses is associated with the lack of non-bridging oxygens in the structure. This intrinsic damage resistance is further improved by adding a compressive layer to the glass via ion exchange. Damage threshold loads obtained for various glasses before ion exchange (pre-IX) and after ion exchange (post-IX) are compared in FIG. 3. Alkali aluminosilicate and soda-lime glasses have damage thresholds before ion exchange of 100 g and 300 g, respectively, whereas the alkali aluminoborosilicate glasses described herein have pre-ion exchange damage thresholds of at least 500 g and, in some instances, at least 1000 g (see examples in tables). When strengthened by ion exchange, some embodiments of the alkali aluminoborosilicate glasses described herein exhibit damage thresholds as high as 7000 g. In contrast, ion exchanged soda-lime glass, having a depth of compressive layer of about 10 μm and a compressive stress of about 650 MPa, reaches a maximum damage threshold of about 800 g. Damage thresholds as high as 5000 g can be achieved in ion exchanged alkali aluminosilicate glasses having a DOL of about 50 μm and a compressive stress of about 750 MPa. By increasing the silica content and/or reducing the alumina concentration of the glasses described herein, the reactivity or degree of breakdown of zircon upon exposure to the glasses described herein can be reduced.

The alkali aluminoborosilicate glass, in some embodiments, has a surface layer under compressive stress, a softening point of less than 900° C. and an indenter damage threshold of at least 5 kg when the glass is strengthened by ion exchange. In these embodiments, the glass comprises, consists essentially of, or consists of: 50-70 mol % $SiO_2$; 5-15 mol % $Al_2O_3$; 5-20 mol % $B_2O_3$; 0-15 mol % $Li_2O$; 0-20 mol % $Na_2O$; and 0-10 mol % $K_2O$; and is substantially free of alkaline earth oxides. In some embodiments, the glass can further comprise up to 10 mol % $P_2O_5$ and/or up to 3.3 mol % of $SnO_2$ can be added as a fining agent. In some embodiments, the alkali aluminoborosilicate glass is also substantially free of at least one of lithium, antimony, arsenic, lead, silver, and copper. In other embodiments, halogens such as fluorine, chlorine, and bromine can be added as fining agents to the alkali aluminoborosilicate glass. By adjusting the concentrations of the various constituents of these glasses, glasses having combinations of desirable attributes such as a low softening point, higher toughness, high compressive stress and depth of layer, and low zircon breakdown viscosity can be obtained. Lower softening points can be obtained, for example, by lowering the silica and alumina concentrations while increasing the boron and alkali content of the glass.

Figure 4:
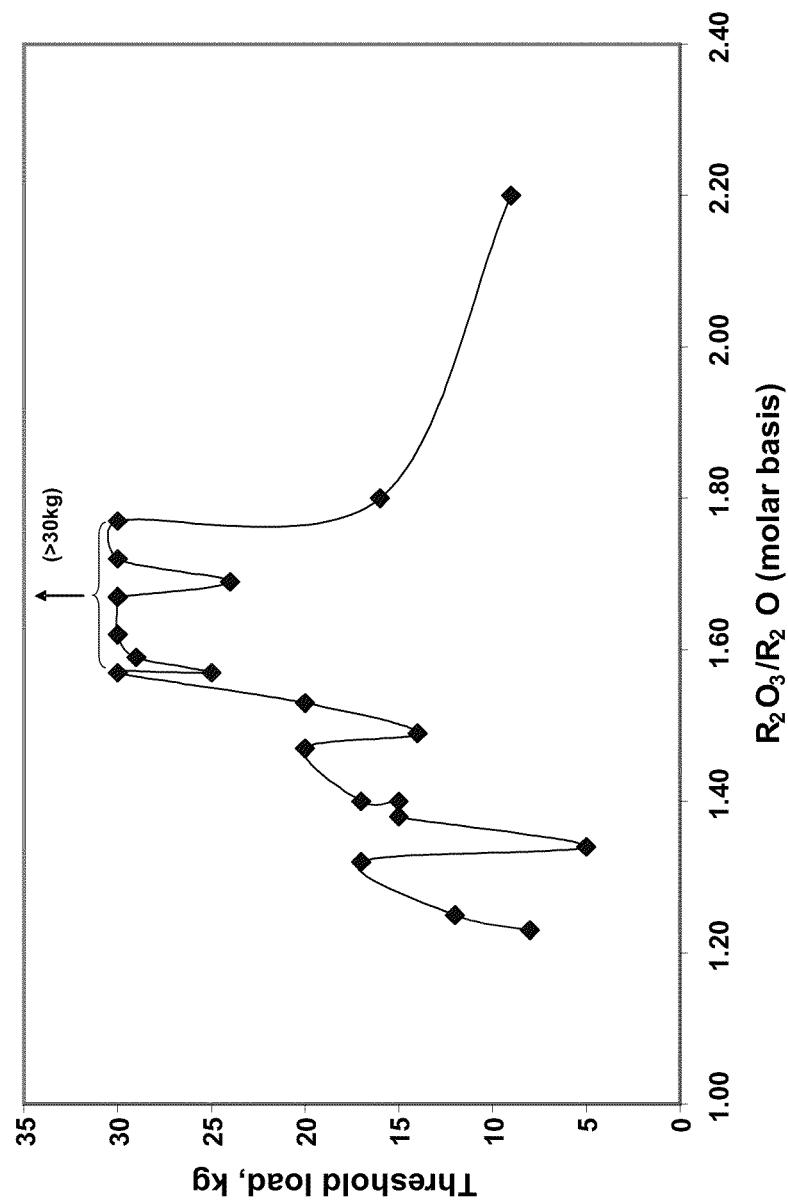
FIG. 4 is a plot of damage threshold as a function of the molar ratio $\Sigma R'_2O_3/\Sigma R_2O$.
Figure 5:
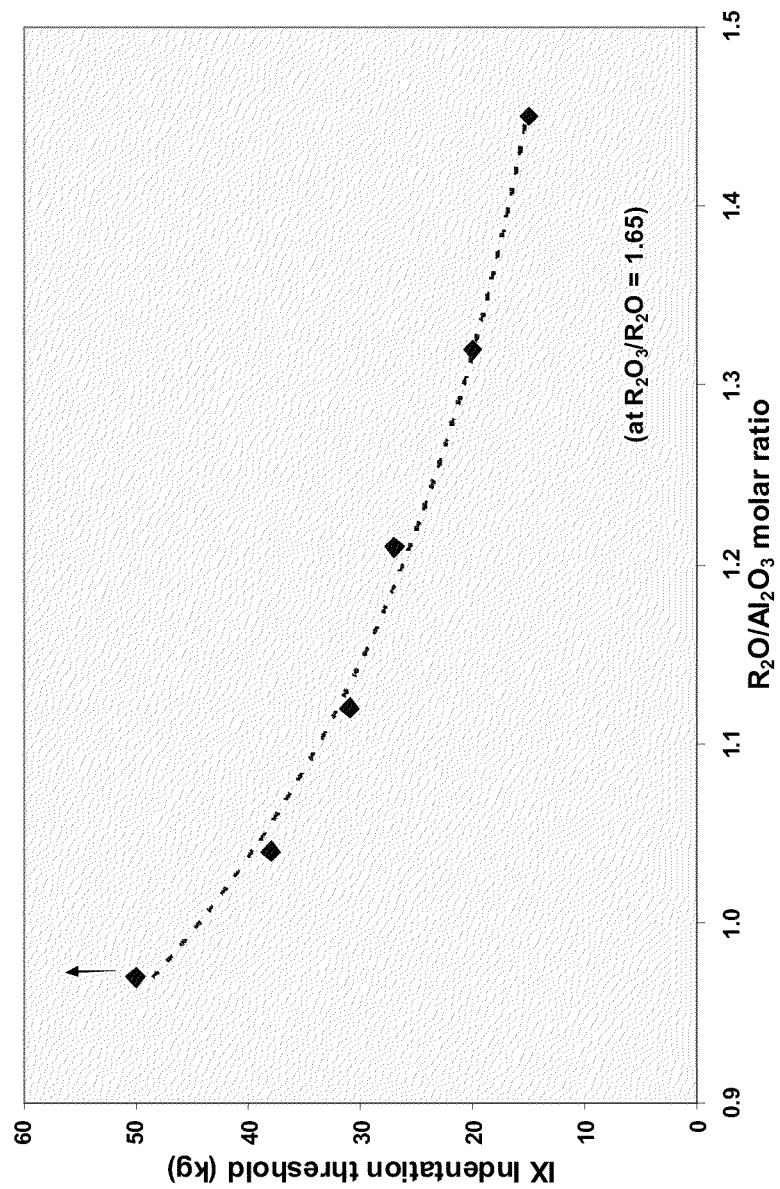
FIG. 5 is a plot of indentation threshold as a function of the molar ratio $\Sigma R_2O/Al_2O_3$.

Greater toughness (i.e., higher damage threshold) following strengthening of the glass by ion exchange can be achieved by adjusting the concentrations of alumina and $B_2O_3$ (together referred to herein as $R'_2O_3$) and the alkali metal oxides (together referred to herein as $R_2O$) so that the molar ratio $\Sigma R'_2O_3/\Sigma R_2O$ is in the range from about 1.5 up to about 1.7 and the molar ratio $\Sigma R_2O/Al_2O_3$ is less than or equal to 1.12. The effect of the ratio $\Sigma R'_2O_3/\Sigma R_2O$ on damage threshold is shown in FIG. 4. The damage threshold falls off rapidly as the value of the ratio moves outside the range $1.5 < \Sigma R'_2O_3/\Sigma R_2O < 1.7$. The effect of the ratio $\Sigma R_2O/Al_2O_3$ on indentation load is shown in FIG. 5. Indentation load increases rapidly as this ratio approaches the charge balance composition (1.00) from higher values. Greater depths of layer and surface compressive stresses are achievable through ion exchange by increasing the alumina content and/or lowering the boron content of the glass.

The compositions of the alkali aluminoborosilicate glasses described herein can be categorized according to the combination of softening temperature and toughness exhibited by each glass. One such group of glasses is deemed "soft and tough" when the glasses possess a softening point in a range from about 725° C. up to about 775° C. and a 200 poise (200 P) temperature in a range from about 1550° C. up to about 1600° C. When strengthened by ion exchange, these glasses have a damage threshold loading in a range from about 5 kg up to about 15 kg. Compositionally, the ratio $\Sigma R'_2O_3/\Sigma R_2O$ for these soft and tough glasses is less than 1.5 and the ratio $\Sigma R_2O/Al_2O_3$ is greater than 1.12. In addition, such soft and tough glasses have a liquidus viscosity of greater than 1 MP (megapoise) and a zircon breakdown viscosity in a range from about 5 kP (kpoise) up to about 15 kP. The properties and representative compositions of soft and tough alkali aluminoborosilicate glasses are listed in Table 2.

TABLE 2

Properties and representative compositions of soft and tough alkali aluminoborosilicate glasses.

| | Soft + tough glasses | | | |
|---|---|---|---|---|
| Composition range | $R_2O_3/R_2O < 1.5$, $R_2O/Al_2O_3 > 1.2$ | | | |
| Typical attributes | Softening Point: 725-775° C. | | | |
| | 200P temperature: 1550-1600° C. | | | |
| | Threshold load: 5-15 kg | | | |
| Examples | AA | BB | CC | DD |
| Composition (mol %) | | | | |
| $SiO_2$ | 63.7 | 61.2 | 65.7 | 60.2 |
| $Al_2O_3$ | 12.0 | 12.5 | 8.0 | 12.5 |
| $B_2O_3$ | 8.0 | 10.0 | 10.0 | 10.0 |
| $Na_2O$ | 15.7 | 15.7 | 15.7 | 15.7 |
| $K_2O$ | 0.6 | 0.6 | 0.6 | 0.6 |
| $P_2O_5$ | — | — | — | 1.0 |
| $SnO_2$ | 0.1 | 0.1 | 0.1 | 0.1 |
| Softening point | 761° C. | 752° C. | 725° | 759° |
| 200P temperature | 1596° C. | 1549° C. | 1446° | 1532° |
| Ion Exchange[1] | | | | |
| Temperature | 390° C. | 410° C. | 420° C. | 420° C. |
| Time | 15 hr | 12 hr | 15 hr | 12 hr |
| CS | 975 MPa | 805 MPa | 642 MPa | 680 MPa |
| DOL | 20 µm | 40 µm | 35 µm | 61 µm |
| Threshold load | 6 kg | 15 kg | not tested | not tested |
| Other | Liquidus viscosity: >1 MP | | | |
| Attributes | Zircon breakdown: 5-15 kP | | | |

[1]Ion exchange in 100% $KNO_3$ salt bath.

The alkali aluminoborosilicate glasses described herein having intermediate softness and toughness have a softening point in a range from about 800° C. up to about 825° C., a 200 P temperature in a range from approximately 1600° C. up to about 1650° C., and a damage threshold loading in a range from about 25 kg up to about 40 kg when strengthened by ion exchange. In addition, the glasses in this intermediate group of alkali aluminoborosilicate glasses have a liquidus viscosity of greater than 1 MP and a zircon breakdown viscosity in a range from about 15 kP (kpoise) up to about 40 kP. The molar ratio $R_2'O_3/R_2O$ for these glasses is in a range from about 1.5 up to about 1.7, and the molar ratio $R_2O/Al_2O_3$ is in a range from about 1.1 up to about 1.2. Representative compositions of alkali aluminoborosilicate glasses having intermediate softness and toughness are listed in Table 3.

TABLE 3

Properties and representative compositions of alkali aluminoborosilicate glasses having intermediate softness and toughness.

| | Glasses with Intermediate Toughness | | | | | |
|---|---|---|---|---|---|---|
| Composition range | $R_2O_3/R_2O$ = 1.5-1.7, $R_2O/Al_2O_3$ = 1.1-1.2 | | | | | |
| Typical attributes | Softening point: 800-825° C. | | | | | |
| | 200P temperature: 1600-1650° C. | | | | | |
| | Threshold load: 25-35 kg | | | | | |

| | Examples (196 series) | | | | | |
|---|---|---|---|---|---|---|
| | EE | FF | GG | HH | II | JJ |
| Composition (mole %) $SiO_2$ | 61.5 | 61.2 | 61.3 | 60.0 | 60.5 | 60.5 |
| $Al_2O_3$ | 13.2 | 13.5 | 14.0 | 14.1 | 13.8 | 14.0 |
| $B_2O_3$ | 10.5 | 10.0 | 9.5 | 10.2 | 10.2 | 10.0 |
| $Na_2O$ | 14.3 | 14.7 | 14.7 | 15.2 | 15.0 | 15.0 |
| $K_2O$ | 0.5 | 0.6 | 0.5 | 0.5 | 0.5 | 0.5 |
| $SnO_2$ | 0.1 | 0.1 | 0.1 | 0.1 | 0.1 | 0.1 |
| Softening point | 801° C. | 798° C. | 825° C. | 803° | 795° | 825° |
| 200P temperature | 1633° C. | 1630° C. | 1651° C. | 1591° | 1590° | 1625° |
| Ion Exchange[1] | | | | | | |
| Temperature | 410° C. | 390° C. | 390° C. | 410° C. | 390° C. | 410° C. |
| Time | 15 hr | 15 hr | 15 hr | 15 hr | 15 hr | 15 hr |
| CS | 758 MPa | 818 MPa | 830 MPa | 775 MPa | 834 MPa | 701 MPa |
| DOL | 41 µm | 35 µm | 41 µm | 40 µm | 39 µm | 56 µm |
| threshold load | 30-35 kg | 25-30 kg | 50 kg | 35-40 kg | 35-40 kg | 30 kg |
| Other | Liquidus viscosity: >1 MP | | | | | |
| Attributes | Zircon breakdown: 15-40 kP | | | | | |

[1]Ion exchange in 100% $KNO_3$ salt bath.

Extremely tough alkali aluminoborosilicate glasses that are described herein have a softening point in a range from about 850° C. up to about 900° C. and a 200 P temperature in a range from about 1650° C. up to about 1700° C. When ion exchanged, these glasses have a damage threshold loading of at least about 45 kg. These glasses each have a liquidus viscosity of greater than 1 MP and a zircon breakdown viscosity in a range from about 35 kP up to about 50 kP. The molar ratio $R'_2O_3/R_2O$ is in a range from about 1.5 up to about 1.7, and the molar ratio $R_2O/Al_2O_3$ in a range from about 0.95 up to about 1.10 for these glasses. Representative compositions of extremely tough alkali aluminoborosilicate glasses are listed in Table 4.

TABLE 4

Properties and representative compositions of alkali aluminoborosilicate glasses having extreme toughness.

| Ultra Tough Glasses | |
|---|---|
| Composition range | $R_2O_3/R_2O$ = 1.5-1.7 $R_2O/Al_2O_3$ = 0.95-1.10 |
| Typical attributes | Softening point: 850-900° C. |
| | 200P Temperature: 1650-1700° C. |
| | Threshold load: ≥45 kg |

| | Examples (196 series) | | | | |
|---|---|---|---|---|---|
| | KK | LL | MM | NN | OO |
| Composition (mole %) $SiO_2$ | 61.5 | 61.0 | 60.5 | 61.5 | 63.0 |
| $Al_2O_3$ | 14.5 | 14.3 | 14.5 | 15.0 | 13.8 |
| $B_2O_3$ | 9.0 | 9.5 | 9.3 | 9.0 | 9.0 |
| $Na_2O$ | 14.5 | 14.7 | 15.2 | 14.0 | 13.7 |
| $K_2O$ | 0.5 | 0.5 | 0.5 | 0.5 | 0.5 |
| $SnO_2$ | 0.1 | 0.1 | 0.1 | | |
| Softening point | 801° C. | 798° C. | 825° C. | 899° C. | 894° C. |
| 200P temperature | 1633° C. | 1630° C. | 1651° C. | 1660° C. | 1685° C. |
| Ion Exchange[1] | | | | | |
| Temperature | 410° C. | 410° C. | 410° C. | 390° C. | 370° C. |
| Time | 15 hr | 15 hr | 15 hr | 15 hr | 15 hr |
| CS | 726 MPa | 805 MPa | 822 MPa | 794 MPa | 718 MPa |
| DOL | 52 μm | 48 μm | 49 μm | 44 μm | 56 μm |
| threshold load | >50 kg | 45-50 kg | not tested | >50 kg | 40-45 kg |
| Other | | Liquidus viscosity: >1 MP | | | |
| | | Zircon breakdown: 35-50 kP | | | |

[1]Ion exchange in 100% $KNO_3$ salt bath.

The alkali aluminoborosilicate glass articles described herein can be formed into planar sheets for use as display windows, cover plates, screens, structural features, and the like, in applications such as, but not limited to, touch screens and mobile electronic devices, including telephones and other communication devices, entertainment devices, and handheld, laptop and notebook computers. In some embodiments, such alkali aluminoborosilicate glass articles are planar (i.e., substantially flat) in shape. Alternatively, these glass articles can be formed by sagging, molding, polishing, grinding, or other means known in the art into non-planar or three-dimensional shapes having some degree of curvature, contour, or a radius profiled portion.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An alkali aluminoborosilicate glass, the glass having a softening point in a range from 650° C. up to 725° C. and an indenter damage threshold of at least 300 g, and wherein the glass has a $B_2O_3/Al_2O_3$ molar ratio of greater than 1.2 and is free of alkaline earth metals, lead, arsenic, and antimony.

2. The alkali aluminoborosilicate glass of claim 1, wherein the glass has a surface layer under compressive stress and an indenter damage threshold of at least 3000 g.

3. The alkali aluminoborosilicate glass of claim 2, wherein the glass has an indenter threshold in a range from about 3000 g up to about 10,000 g.

4. The alkali aluminoborosilicate glass of claim 2, wherein the surface layer is ion exchanged.

5. The alkali aluminoborosilicate glass of claim 2, wherein the surface layer has a depth of layer of at least 20 pm and a compressive stress of at least 700 MPa.

6. The alkali aluminoborosilicate glass of claim 1, wherein the glass comprises: 50-70 mol % $SiO_2$; 5-15 mol % $Al_2O_3$; 5-20 mol % $B_2O_3$; 0-15 mol % $Li_2O$; 0-20 mol % $Na_2O$; and 0-10 mol % $K_2O$.

7. The alkali aluminoborosilicate glass of claim 6, wherein the glass is free of lithium.

8. The alkali aluminoborosilicate glass of claim 6, wherein the glass consists essentially of: 50-70 mol % $SiO_2$; 5-15 mol % $Al_2O_3$; 5-20 mol % $B_2O_3$; 0-15mol % $Li_2O$; 0-20 mol % $Na_2O$; and 0-10 mol % $K_2O$.

9. The alkali aluminoborosilicate glass of claim 1, wherein the glass is inert with respect to zircon at temperatures at which the viscosity of the glass is at least 5 KP.

10. The alkali aluminoborosilicate glass of claim 1, wherein the glass has a liquidus viscosity of at least 135 KP.

11. The alkali aluminoborosilicate glass of claim 10, wherein the glass has a liquidus viscosity of at least 1 MP.

12. The alkali aluminoborosilicate glass of claim 1, wherein the glass is down-drawable.

13. The alkaline aluminoborosilicate glass of claim 1, wherein the glass is formed into a glass article, wherein the glass article is one of a display window, a cover plate, a screen, and a structural feature for an electronic device.

14. The alkaline aluminoborosilicate glass of claim 1, wherein the glass article is non-planar.

15. An alkali aluminoborosilicate glass, the glass having a surface layer under compressive stress, a softening point in a range from about 850° C. up to about 900° C. and an indenter damage threshold of at least 5 kg, and wherein the glass has a $R'_2O_3/R_2O$ molar ratio in a range from 1.5 up to 1.7 and a molar ratio $R_2O/Al_2O_3$ in a range from 0.95 up to 1.10, where $R'_2O_3=Al_2O_3+B_2O_3$ and $R_2O=Li_2O+Na_2O+K_2O$, and is free of alkaline earth metals, lead, arsenic, and antimony.

16. The alkali aluminoborosilicate glass of claim 15, wherein the glass comprises: 50-70 mol % $SiO_2$; 5-15 mol % $Al_2O_3$; 5-20 mol % $B_2O_3$; 0-15 mol % $Li_2O$; 0-20 mol % $Na_2O$; and 0-10 mol % $K_2O$.

17. The alkali aluminoborosilicate glass of claim 15, wherein the glass comprises: 50-70 mol % $SiO_2$; 5-15 mol % $Al_2O_3$; 3-20 mol % $B_2O_3$; and 10-20mol % $Na_2O$.

18. The alkali aluminoborosilicate glass of claim 15, wherein the glass is free of lithium.

19. The alkali aluminoborosilicate glass of claim 15, wherein the indenter damage threshold is in a range from 5 kg up to 15 kg.

20. The alkali aluminoborosilicate glass of claim 15, wherein the surface layer is ion exchanged.

21. The alkali aluminoborosilicate glass of claim 15, wherein the glass has a liquidus viscosity of at least 1 MP.

22. The alkali aluminoborosilicate glass of claim 15, wherein the glass is down-drawable.

23. The alkaline aluminoborosilicate glass of claim 15, wherein the glass is formed into a glass article, wherein the glass article is one of a display window, a cover plate, a screen, and a structural feature for an electronic device.

24. The alkali aluminoborosilicate glass of claim 22, wherein the glass article is non-planar.

25. The alkali aluminoborosilicate glass of claim 20, wherein the glass has a damage threshold load of at least about 45 kg.

* * * * *